United States Patent Office 2,972,515
Patented Feb. 21, 1961

2,972,515

PRODUCTION OF METAL FLUORIDES

Isadore Mockrin, Philadelphia, Pa., assignor to Pennsalt Chemicals Corporation, Philadelphia, Pa., a corporation of Pennsylvania No Drawing. Filed May 23, 1957, Ser. No. 661,017

5 Claims. (Cl. 23—88)

This invention relates to the manufacture of metal fluorides, and more particularly to the preparation of metal fluorides by initiating a reaction between substantially dry reactants at temperatures below 100° C.

It has generally been the practice in preparing metal fluorides to prepare the metal fluoride either by reacting the metal, or a metal compound, directly with gaseous fluorine or HF, or by reaction between metal compounds and HF in an aqueous solution.

The use of gaseous fluorine or hydrogen fluoride is objectionable due to their corrosive action. Where the reaction is carried out in an aqueous medium considerable difficulty is frequently encountered in obtaining an anhydrous product. The combined water in the product is difficult to remove without loss of fluorine values. Another objection to aqueous reactions is that the water necessary for the reaction necessitates larger reaction equipment. Also, where aqueous solutions of hydrogen fluoride are used, acid corrosion of equipment becomes a definite problem.

I have now discovered a new process whereby metal fluorides can be prepared at relatively low temperatures. The process obviates the necessity of using an aqueous reaction medium or fluorinating agent like fluorine or hydrogen fluoride. I have discovered that when alkali metal fluoride is ground together with a chloride or sulfate of a metal of the group consisting of beryllium, calcium, magnesium, strontium, barium, zinc, cadmium, copper, lead, aluminum, lithium and sodium and heat is applied to the mixture, a reaction will start at temperatures below 100° C. Any of the alkali metal fluorides, with the exception of sodium and lithium may be employed. In some instances the reaction occurs at or only slightly above room temperatures. This is surprising when it is considered that the reactants are substantially dry. The only moisture present is water of crystallization and what may be picked up from the air.

Since the reactions are substantially dry and occur at low temperatures, there is little if any problem with respect to equipment corrosion. Also, a substantial saving in reaction space is obtained over that necessary in aqueous phase reactions.

The reactions are all exothermic, and many of the reactions generate substantial amounts of heat. For example, when potassium fluoride and aluminum sulfate are ground together and heated to a temperature of about 40° C., the reaction proceeds with the generation of sufficient heat to raise the temperature of the reactants to above 100° C.

The reactions between the alkali metal fluorides and the other metal sulfates and chlorides also are exothermic and start at temperatures below 100° C. in a substantially dry state if the reactants are first ground together in a powdered form. These reactions are initiated by raising the temperature of the mass. In some instances the reaction may have such a low initiating temperature that it may occur during the grinding step, at room temperature. This can be prevented, if desired, by cooling the powder before grinding.

In practicing the present invention, the alkali metal fluoride and the metal sulfate or chloride are mixed together as dry powders. This is preferably done by grinding. Heat is then applied to the mixture. Reaction between the two salts to form the metal fluoride will take place between 25° and 100° C., and can easily be detected by following the rate of rise of the temperature of the mixture; the reaction is in every case exothermic, and as soon as the reaction begins, a sharp, spontaneous rise in the temperature of the mixture will occur. The reaction, once begun, goes rapidly to completion. The spontaneous reaction, as evidenced by the increased temperature of the mixture, occasionally begins at room temperature; usually, however, it is necessary to apply a little external heat to bring the reaction mixture up to its spontaneous reaction temperature. In no case need the applied heat exceed 100° C., since all the reactions will start before this temperature is reached.

Depending principally on the mass of the reaction mixture, the spontaneous heat increase that occurs when the reaction takes place will vary from a few degrees to over a hundred degrees; in large masses, where dissipation of evolved heat is slower, the accumulated heat may bring the temperature of the reaction above 100° C. It should be particularly noted, however, that this evolved heat must be distinguished from the applied heat; the reaction is substantially complete within a short interval after its initiation, and the evolved heat is merely one of the products of the reaction, which is essentially independent thereof.

Since the reactions are substantially dry and occur at low temperatures, there is little, if any, difficulty with respect to equipment corrosion. Also, a substantial saving in reaction space is obtained over that necessary in aqueous phase reactions.

Another advantage of the present process is that the metal fluoride product can generally be readily separated from the reaction products by washing with water. This may be done by slurrying the reaction products in water. The metal fluoride, which is usually insoluble, remains in its solid form while the alkali metal salt formed, which is either a sulfate or chloride depending on the metal salt used, passes into solution. The insoluble metal fluoride may then be removed from the wash liquor by any suitable means. The metal salt is then dried. Drying occurs readily at 110° C. Where the metal salt is obtained through reaction in an aqueous medium chemically combined water is still present after this drying step and cannot be removed without using substantially higher temperatures.

*Example 1*

Sixteen grams of a reaction mixture corresponding to 2 moles of C.P. KF per mole of $Na_2SO_4$ were ground together and then placed in a water bath at 48° C. A reaction was initiated and a temperature rise of 18° C. occurred. The final temperature of the reaction mixture was 52° C. and that of the water bath 47° C. X-ray patterns of the product showed none of the starting material present.

*Example 2*

Eight grams of a reaction mixture corresponding to 2 moles of C.P. KF per mole of $CuSO_4$, anhydrous, were ground. During the grinding the temperature of the mixture rose about 20° showing that a reaction was initiated. The ground mixture which was then at 49° C. was placed in a water bath at 53° C. However, no further reaction occurred. The same mixture was then placed in a water bath at 60° C. and the temperature of the reaction mixture rose rapidly to 87° C. X-ray patterns of the final reaction mixture indicated complete reaction, none of the starting materials being observed.

Example 3

Eight grams of a reaction mixture corresponding to 2 moles of C.P. KF per mole of $CaSO_4$ were ground together and placed in a vial. The temperature of the mixture rose from 30° C., room temperature, to 56° C. Heating of the mixture in a water bath up to 75° C. revealed a possible second reaction at about 65° C. X-ray patterns of the product failed to show the presence of any of the starting material.

Example 4

Ten grams of a mixture corresponding to 2 moles of C.P. KF per mole of $BaCl_2$ were ground and placed in a vial. A temperature rise of about 29° C. resulted. The mixture was not heated. The X-ray pattern of the products showed the presence of $BaF_2$ and $KCl$.

Example 5

Eight grams of a mixture corresponding to 2 moles of C.P. KF per mole of $BaSO_4$ were ground (the mineral barite was used as the $BaSO_4$ source). The mixture was not heated. The X-ray pattern showed the presence of $BaF_2$ and none of the starting materials.

Example 6

Eight grams of a mixture corresponding to 3 moles of C.P. KF per mole of $ZnSO_4$ were ground and placed in a vial. The temperature of the mixture rose from 30° C., room temperature, to 61° C. in about 2½ minutes. After the mixture was allowed to cool to 50° C., it was placed in a water bath at 71° C. The temperature of the mixture then rose to 72° C. and remained at 72° C. for 3½ minutes while the temperature of the bath fell to 68° C. The bath was then heated to 90° C. An X-ray pattern of the resulting product showed that the reaction was substantially complete, none of the starting materials being indicated.

Example 7

Twenty grams corresponding to a mixture of 2 moles of C.P. KF per mole of $PbCl_2$ were ground and placed in a test tube. The temperature of the mixture rose from room temperature (26° C.) to 33° C. The test tube was then placed in a water bath which was at 25° C. and the bath then heated continuously. When the temperature of the bath was 40° C., the temperature of the mixture was 37° C. However, one minute later, when the bath temperature was 42° C., the reaction mixture temperature was 47° C. The reaction mixture temperature was always higher than the bath temperature for the next 29 minutes, at which time the bath temperature was 80° C. Final temperature was 95° C. The product could not be removed from the test tube nor could the thermometer in the reaction mixture be removed. After breaking the test tube, the product was removed as a coherent mass, the surface of which could, however, be powdered by rubbing. The X-ray pattern of the products showed the presence of $KCl$+an unknown.

Example 8

Eight grams of a mixture corresponding to 6 moles of C.P. KF per mole of $Fe_2(SO_4)_3$ were ground and placed in a vial. The temperature of the mixture then rose from room temperature, 29° C., to 65° C. in about 1½ minutes. The mixture was then heated to 98° C. The X-ray pattern of the final product indicated that the reaction was substantially complete, none of the starting materials being present.

Example 9

Sixteen grams of a mixture corresponding to 2 moles of C.P. KF per mole of $PbSO_4$ were ground and placed in a vial. The mineral anglesite was the $PbSO_4$ used. A small temperature rise occurred. The mixture was then placed in a water bath at 46° C. The temperature of the mixture then rose to 55° C. while the water bath temperature fell to 44° C. The mixture was then heated to 90° C. The X-ray pattern of the product showed the presence of $PbF_2$ and $K_2SO_4$ and none of the original materials.

Example 10

Sixteen grams of a mixture corresponding to 2 moles of C.P. KF per mole of the mineral celestite ($SrSO_4$) were ground and placed in a vial. A reaction was initiated at about 31° to 42° C. The products were identified by X-ray patterns at $SrF_2$ and $K_2SO_4$. None of the original materials was present.

The above 10 examples have been selected for the purpose of best illustrating the invention. The invention, however, is not limited to these examples alone. The variations in peak heat with variations in percent alkali fluoride reacted and in total mass occur generally in all reactions of the type herein disclosed though in varying degree. Inclusion of such details in all of the examples would serve only to add to the length of the description.

Also, in selecting most of the examples, the preferred salt, i.e., the metal sulfate has been employed. Only two examples illustrate the use of the metal chloride. These are Examples 4 and 7. This does not mean that the chlorides are limited to barium chloride and lead chloride. Any of the other metal chlorides may be employed.

It will also be noted that in the examples potassium fluoride has been employed. This is the preferred reactant. However, caesium fluoride and rubidium fluoride can readily be used in place of potassium fluoride in any of the examples given and similar reactions obtained.

The process of the present invention is particularly suitable in many instances in preparing metal fluorides from minerals containing the metals. Thus any of the minerals barite ($BaSO_4$), anhydrite ($CaSO_4$), anglesite ($PbSO_4$), celestite ($SrSO_4$), kieserite ($MgSO_4 \cdot H_2O$) and cotunnite ($PbCl_2$) can be used.

This application is a continuation-in-part of my co-pending application Serial No. 392,747, filed November 17, 1953, now U.S. Patent 2,800,389, issued July 23, 1957.

I claim:

1. In a method of making metal fluorides, the steps comprising forming a finely divided intimate admixture of potassium fluoride with a metal salt selected from the group consisting of barium sulfate, strontium sulfate, calcium sulfate and lead sulfate, and initiating a reaction between said potassium fluoride and said metal salt by heating said mixture to a temperature between 25° C. and 100° C. at which a spontaneous rise in temperature of the reaction mass occurs.

2. The process of claim 1 in which the metal salt is barium sulfate.

3. The process of claim 1 in which the metal salt is strontium sulfate.

4. The process of claim 1 in which the metal salt is calcium sulfate.

5. The process of claim 1 in which the metal salt is lead sulfate.

References Cited in the file of this patent

UNITED STATES PATENTS 2,800,389    Mockrin _____ July 23, 1957